May 25, 1965   B. A. FARABAUGH, JR., ET AL   3,185,428
MOUNTING SYSTEM
Filed Nov. 12, 1963   2 Sheets-Sheet 1
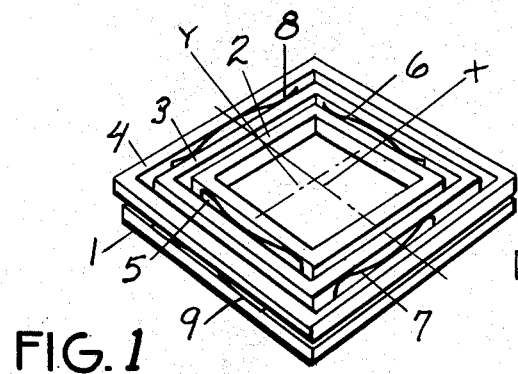
FIG. 1
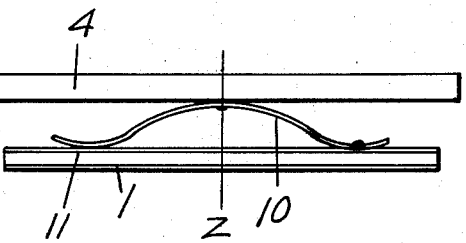
FIG. 2
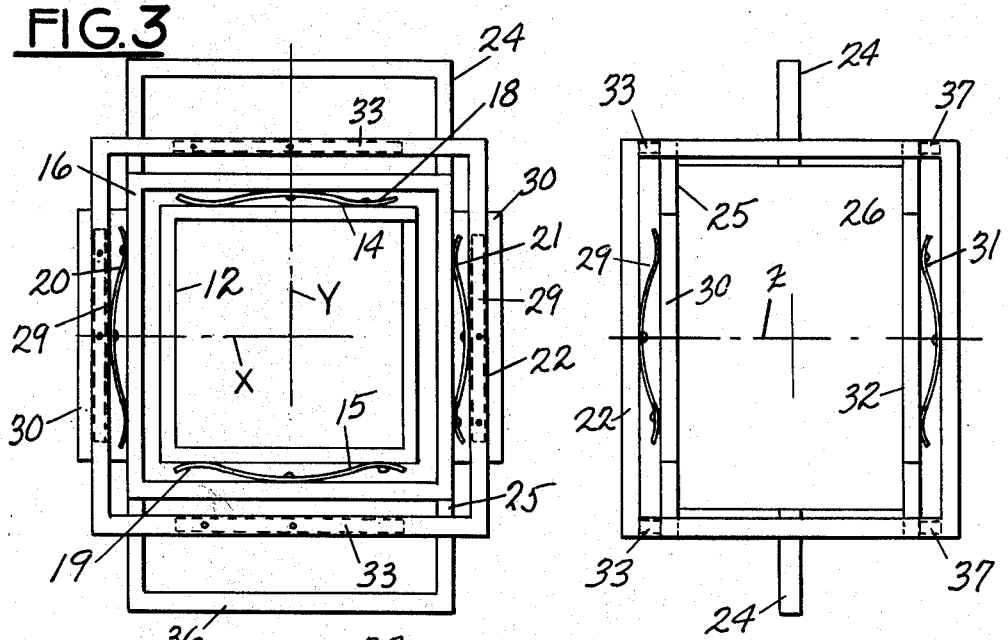
FIG. 3
FIG. 5
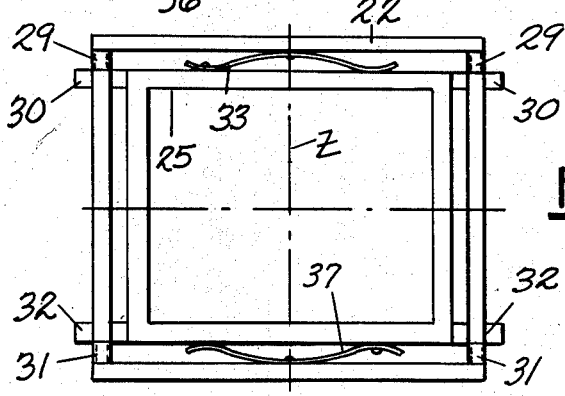
FIG. 4
INVENTOR.
Bernard A. Farabaugh Jr
BY James T Gwinn Jr
Ralph Hammar
attorney

3,185,428
MOUNTING SYSTEM
Bernard A. Farabaugh, Jr., and James T. Gwinn, Jr., Erie, Pa., assignors to Lord Manufacturing Company, Erie, Pa., a corporation of Pennsylvania
Filed Nov. 12, 1963, Ser. No. 322,876
7 Claims. (Cl. 248—358)

This invention is a mounting system which permits translation but resists rotation on the supported body. In one form, translation is permitted along three mutually perpendicular axes and rotation is prevented about only one of the three axes. In another form, translation is permitted and rotation is prevented about all three axes.

Figure 6:
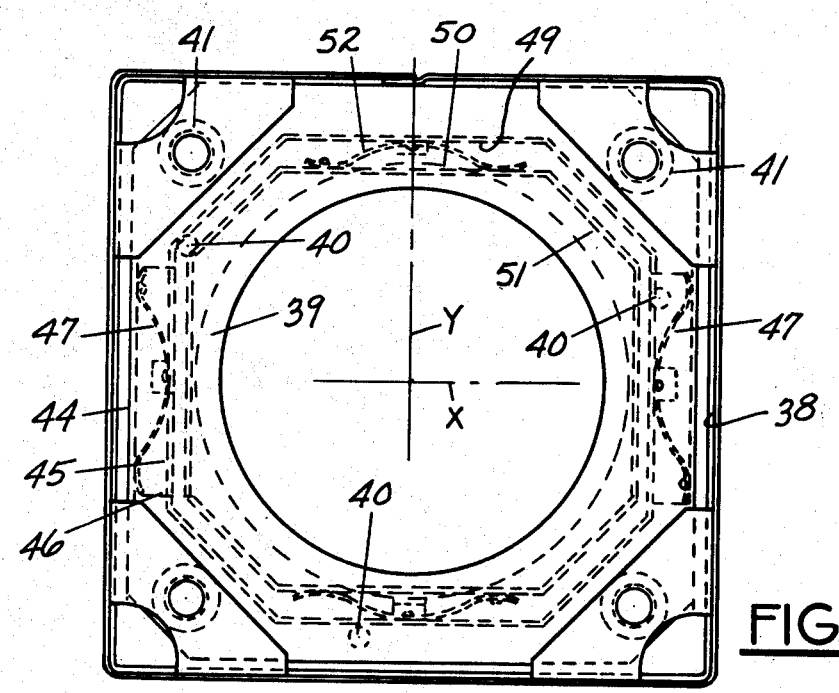
Figure 7:
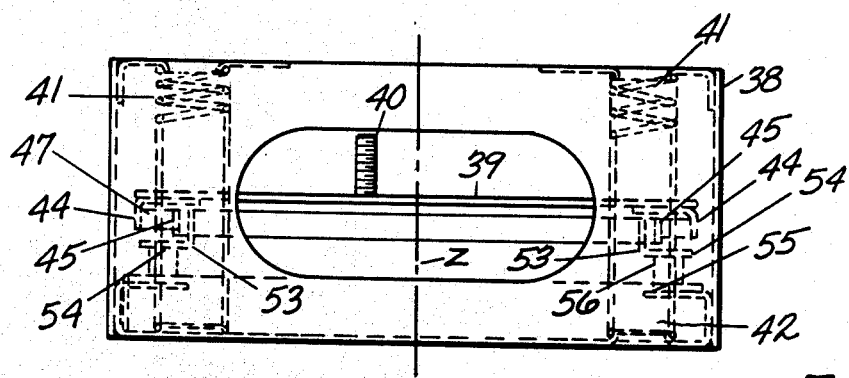
Figure 8:
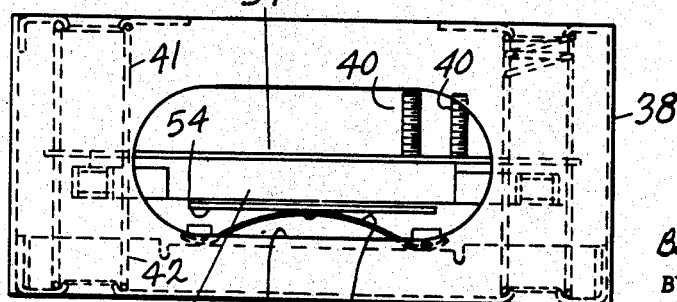

In the drawing, FIG. 1 is a perspective of a mounting system in which rotation is prevented about only one axis while translation is permitted along three mutually perpendicular axes, FIG. 2 is an edge view from the back of FIG. 1, FIG. 3 is a top plan view of a mounting system in which translation is permitted along and rotation is prevented about all three mutually perpendicular axes, FIG. 4 is a front view of the FIG. 3 system, FIG. 5 is a side view of the FIG. 3 system, FIG. 6 is a top plan view of another form of mounting system in which rotation is prevented about only one axis, FIG. 7 is a front view of the FIG. 6 system and FIG. 8 is a side view of the FIG. 6 system.

In the mounting system of FIGS. 1 and 2 there are four relatively movable parts, a base 1 adapted to be attached to any suitable supporting structure, a frame 2 adapted to receive the equipment to be supported and intermediate frames 3 and 4. By the structure to be described, the frame 2 may move in all major translation directions, horizontal and vertical, relative to the base 1 but is restrained from rotational or angular motion about a vertical axis.

The connection between the frame 2 and the frame 3 comprises leaf springs 5 and 6, spaced on opposite sides of axis X with the centers of the springs on axis Y. In this sense, the springs 5 and 6 are centered on axis Y. Both springs are fixed at one end to the frame 2 and at the center to the frame 3. The ends which are attached to the frame 2 are diagonal to each other rather than directly across from each other. This is done in order to have a true four bar or parallel motion linkage and to allow the frame 2 to translate along horizontal axis Y. The springs 5 and 6 extend lengthwise in a horizontal plane along axis X and edgewise in a vertical plane along axis Z. The axes X, Y and Z are mutually perpendicular to each other and the springs 5 and 6 are on opposite sides of the common intersection of these axes.

The frame 3 is connected to the frame 4 by leaf springs 7 and 8, centered on axis X, both arranged with their long axes along axis Y and in a horizontal plane and with their edges vertical or along axis Z. The springs 7 and 8 are on opposite sides of the common intersection of the axes X, Y and Z. The centers of the leaf springs 7 and 8 are fixed to the frame 4 and one end of each of the springs 7 and 8 is fixed to the frame 3 diagonally across from each other. The springs 7 and 8 are generally perpendicular to the springs 5 and 6 and permit the frames 2 and 3 to translate relative to the frame 4 along the other horizontal axis X.

The frame 4 is connected to ground (base 1) by springs 9 and 10 with their edges horizontal. These springs are connected in the same manner as the springs 5–8 with the centers fixed to the frame member 4 and with the ends diagonally fixed to the base 1. The springs 9 and 10 are not centered on the Z axis but are arranged on opposite sides of the Z axis and centered on Y axis, but could be centered on the X axis. The springs 9 and 10 allow the frames 2, 3 and 4 to translate along the vertical axis Z relative to the base 1.

It is possible to reverse the order of attachment of the springs in regard to which frame the center of each spring is fixed and to the planes in which each set is located, provided the sets of springs are located in three mutually perpendicular planes and the springs are connected to form four bar or parallel motion linkages.

Friction material 11 is arranged between the free end of each spring and the frame on which it rubs. This provides friction damping, which controls the maximum motion of the system. The inherent resilience of the springs may provide the entire force needed for friction damping and the entire elastic restraint between the various frames. Supplemental springs may be used.

Rotational input to cause relative rotation between the frame 2 and the base 1 about a vertical or Z axis will cause all of the flat springs 5–10 to act in tension or compression. The springs are very stiff in this direction and a high resistance is developed to the rotational input. The flat springs are soft in the thickness direction and, accordingly, permit translation in any of the three mutually perpendicular axes in the thickness directions.

In the modification of FIGS. 3, 4 and 5, translation is permited along and rotation is prevented about all three axes. At the center is a frame 12 on which equipment may be mounted. Centered on axis Y are leaf springs 14, 15 (similar to springs 5, 6) having their width direction perpendicular to the axis Y. The springs 14 and 15 extend lengthwise parallel to axis X and edgewise parallel to the vertical axis Z, the axes X, Y and Z being mutually perpendicular. One end of each of the springs 14, 15 is fixed to the frame 12 and the centers of the springs are fixed to a frame 16 arranged in the same plane as the frame 12. Forces in the direction of the Y axis are cushioned by the springs 14 and 15 which are soft in this direction. Forces along axes X and Z are not cushioned by the springs 14 and 15 because the springs are stiff in these directions. Friction damping is provided by the free ends 18 and 19 of the springs which ride on the frame 12.

Centered on the axis X are leaf springs 20 and 21 (similar to springs 7, 8), each having one end fixed to the frame 16 and having the center fixed to a frame 22 surrounding the frame 16 and lying in the same plane as the frames 12 and 16. Forces along the axis X are cushioned by the springs 20 and 21 because these forces act in the thickness direction of the springs. Forces along the axes Y and Z are not cushioned because these forces act respectively lengthwise and edgewise of the springs 20 and 21.

The combination of the springs 14, 15, 20 and 21 cushion the frame 12 for forces acting along axes Y and X and provide a rigid support for the frame for forces along axis Z perpendicular to the axes Y and X. Torsional forces about the axes X, Y and Z are rigidly resisted by the springs. Torsion about the axis X stresses the springs 14, 15, 20 and 21 edgewise, a direction in which the springs are stiff. Torsion about the axis Y also stresses the springs 14, 15, 20 and 21 edgewise. Torsion about the axis Z stresses the springs 14, 15, 20 and 21 lengthwise in either tension or compression. Since the springs are all stiff in edgewise and lengthwise directions, rotation of the frame 12 relative to the frames 16 and 22 about any of the axes X, Y or Z is effectively prevented.

The base has extensions 24 to be rigidly attached to a supporting structure and frame 25 spaced inside the frame 22 and below frame 16. The connection between the frame 25 and the frame 22 comprises two leaf springs 29 centered on axis X (FIG. 3) and arranged between the underside of the frame 22 (FIG. 5) and pads 30 on the frame 25. The springs 29 are arranged with the thickness direction parallel to the axis Z to cushion forces in this direction. Similar springs 31 are arranged between the lower side of frame 22 and pads 32 on the frame 25. The springs 29 and 31 provide a soft spring support for vertical loads along axis Z and resist torsion about the axis Z and also about the axis X. Torsion about the axis Y is resisted by leaf springs 33 arranged between the upper side of frames 22 and 25 and by similar springs 37 arranged between the lower side of frames 22 and 25. The springs 33 and 37 provide a soft spring connection for vertical load in the direction of axis Z while preventing angular motion about axes Z and Y.

The combined effect of the springs 29, 31, 33, 37 is to permit translation of the frames 12, 16 and 22 relative to the base along the Z axis while preventing torsion about the X and Y axes. The springs 29, 31 and 33, 37 are spaced along the Z axis but are not centered on the Z axis as is evident from FIGS. 4 and 5. The springs 29, 31, 33, 37 could be replaced by two springs centered on the Z axis and on opposite sides of the common intersection of the X, Y and Z axes in the same manner as the springs 5, 6; 7, 8; 14, 15; and 20, 21.

The system of FIGS. 6, 7 and 8 is generally similar to the system of FIGS. 1 and 2. There is a base 38 for rigid attachment to a supporting structure and a tray 39 with studs 40 for attachment to the equipment to be supported. The tray 39 corresponds to the frame 2 in FIG. 1. The vertical load on the tray is cushioned by springs 41 and 42 respectively arranged between the upper and lower sides of the tray and the base 38.

At opposite sides of the tray 39 and centered on horizontal axis X are depending flanges 44 which are opposite surfaces 45 on an intermediate frame 46. Two leaf springs 47 are arranged between the flanges 44 and the surfaces 45 in the same manner as the springs 7 and 8 in FIG. 1.

Centered on horizontal axis Y are surfaces 49 on diametrically opposite sides of intermediate frame 46 and opposed to corresponding surfaces 50 on frame 51. Between the surfaces 49 and 50 are two leaf springs 52 corresponding to the springs 5 and 6 in FIG. 1.

Depending from the member 51 are brackets 53 having horizontal surfaces 54 opposed to horizontal surfaces 55 on the base 38. Between these surfaces 54 and 55 are arranged two leaf springs 56 corresponding to the springs 9 and 10, in FIG. 1.

The springs 47 permit translation of the tray 39 along the X axis and resist rotation about the Y and Z axes. The springs 52 permit translation of the tray along the Y axis and resist rotation about the X and Z axes. The springs 56 permit translation of the tray along the Z axis and resist rotation about the Z axis.

What is claimed as new is:

1. A mounting system comprising a first frame for carrying a supported body, a second frame spaced from the first frame, first leaf springs between the first and second frames, the thickness direction of the springs extending along a first axis and the length and width directions extending along second and third axes perpendicular to each other and to the first axis, connections between the first springs and the first and second frames preventing rotation of the first springs relative to the first and second frames about said first, second and third axes, a third frame spaced from the second frame, second leaf springs between the second and third frames, the thickness direction of the second springs extending along said second axis and the length and width directions extending along said first and third axes, connections between the second springs and the second and third frames preventing rotation of the second springs relative to the second and third frames about said first, second and third axes, a base spaced from the third frame, third leaf springs between the third frame and base, the thickness direction of the third springs extending along said third axis and the length and width directions extending along the first and second axes, and connections between the third springs and the base preventing rotation of the third springs relative to the third frame and base about the first, second and third axes.

2. A mounting system comprising a first frame for carrying a supported body, a second frame spaced from the first frame, first leaf springs between the first and second frames and spaced along a first axis, the thickness direction of the springs extending along said first axis and the length and width directions extending along second and third axes perpendicular to each other and to the first axis, spaced portions of the first springs being fixed respectively to the first and second frames, a third frame spaced from the second frame, second leaf springs between the second and third frames and spaced along said second axis, the thickness direction of the second springs extending along said second axis and the length and width directions extending along said first and third axes, spaced positions of the second springs being fixed respectively to the second and third frames, a base spaced from the third frame, third leaf springs between the third frame and base, the thickness direction of the third springs extending along said third axis and the length and width directions extending along the first and second axes, spaced portions of the third springs being fixed respectively to the third frame and base.

3. A mounting system comprising a first frame for carrying a supported body, a second frame spaced from the first frame, first bowed leaf springs between the first and second frames centered on a first axis and on opposite sides of the common intersection of second and third axes perpendicular to each other and to the first axis, the thickness direction of the springs extending along a first axis and the length and width directions extending along said second and third axes, the centers of the first springs being fixed to one of the first and second frames and diagonal ends of the first springs being fixed to the other of the first and second frames, a third frame spaced from the second frame, second bowed leaf springs between the second and third frames centered on the second axis and on opposite sides of the common intersection of the first, second and third axes, the thickness direction of the second springs extending along said second axis and the length and width directions extending along said first and third axes, the centers of the second springs being fixed to one of the second and third frames and diagonal ends of the second springs being fixed to the other of the second and third frames, a base spaced from the third frame, third leaf springs between the third frame and base, the thickness direction of the third springs extending along said third axis and the length and width directions extending along the first and second axes, and connections between the third springs and the base preventing rotation of the third springs relative to the third frame and base about the first, second and third axes.

4. A mounting system comprising a first frame for carrying a supported body, a second frame spaced from the first frame, first bowed leaf springs between the first and second frames centered on a first axis and on opposite sides of the common intersection of second and third axes perpendicular to each other and to the first axis, the thickness direction of the springs extending along a first axis and the length and width directions extending along said second and third axes, the centers of the first springs being fixed to one of the first and second frames and diagonal ends of the first springs being fixed to the other of the first and second frames, a third frame spaced from the second frame, second bowed leaf springs between the second and third frames centered on the second axis and on opposite sides of the common intersection of the first, second and third axes, the thickness direction of the second springs extending along said second axis and the length and width directions extending along said first and third axes, the centers of the second springs being fixed to one of the second and third frames and diagonal ends of the second springs being fixed to the other of the second and third frames, a base spaced from the third frame, third leaf springs between the third frame and base spaced along the third axis, the thickness direction of the third springs extending along said third axis and the length and width directions extending along the first and second axes, and spaced portions of the third springs being fixed respectively to the third frame and base.

5. The mounting system of claim 2 in which the third leaf springs are spaced on opposite sides of said third axis.

6. The mounting system of claim 5 in which the third leaf springs are centered respectively on the first and second axes and are spaced from the common intersection of the first, second and third axes.

7. The mounting system of claim 4 in which the ends of the springs not fixed to the frames rub on the frames to provide friction damping.

References Cited by the Examiner
UNITED STATES PATENTS

| | | | |
|---|---|---|---|
| 1,880,982 | 10/32 | Rawlings | 248—358.1 |
| 2,756,015 | 7/56 | Larisch | 248—258.1 |
| 2,932,546 | 4/60 | Marggraf et al. | 312—352 |

CLAUDE A. LE ROY, *Primary Examiner.*